(No Model.) 2 Sheets—Sheet 2.
F. TRUMP.
HAY TEDDER.
No. 301,183. Patented July 1, 1884.
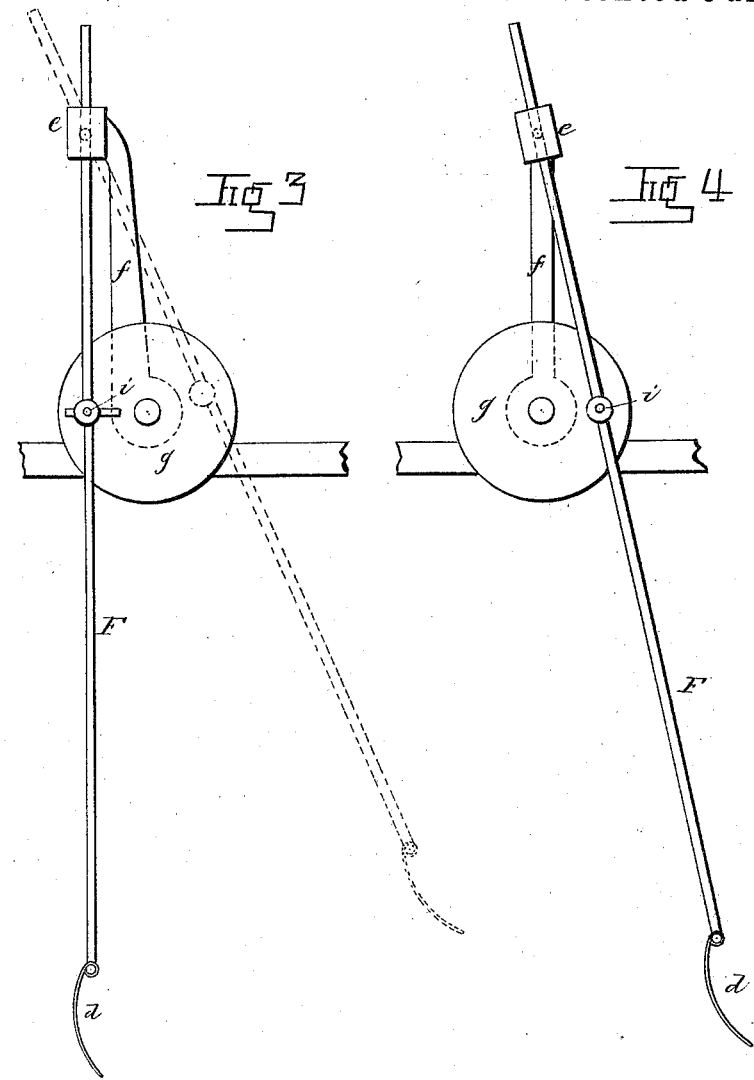
Witnesses:
Jno. J. Hinkel
H. E. Hansmann.
Fuller Trump
Inventor:
By Foster & Freeman
Attys

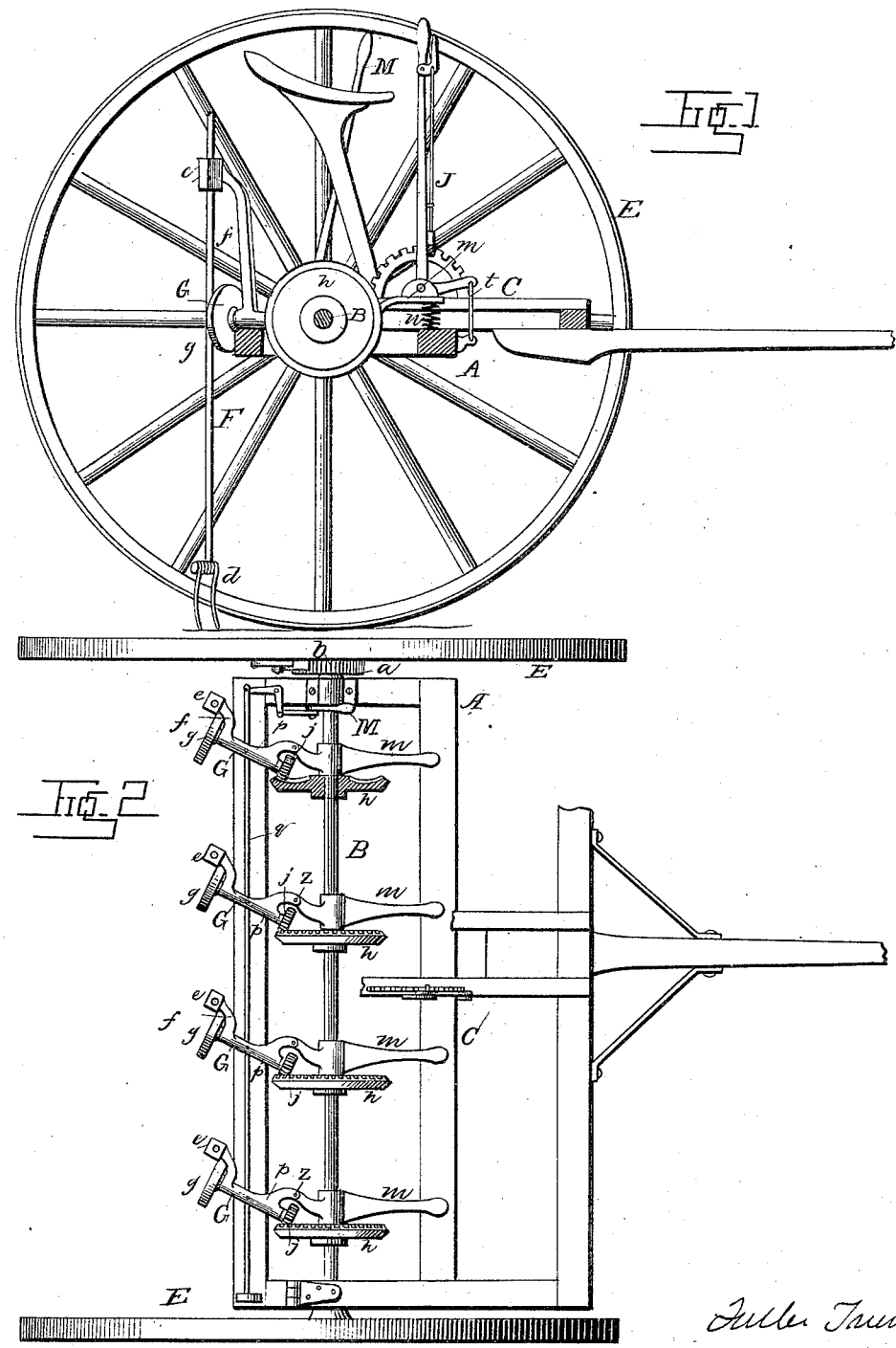

UNITED STATES PATENT OFFICE.

FULLER TRUMP, OF SPRINGFIELD, OHIO.

HAY-TEDDER.

SPECIFICATION forming part of Letters Patent No. 301,183, dated July 1, 1884.

Application filed November 16, 1883. (No model.)

*To all whom it may concern:*

Be it known that I, FULLER TRUMP, a citizen of the United States, and a resident of Springfield, Clark county, and State of Ohio, have invented certain new and useful Improvements in Hay-Tedders, of which the following is a specification.

This invention relates to machines for tedding hay; and it consists of a series of forks arranged across the machine, and certain appliances whereby each fork is caused to swing up and down and back and forth crosswise of the machine, so as to enter the hay, toss it to one side, and then rise therefrom, with a motion very similar to that made in operating the forks by hand, and without dragging the forks on the ground.

The invention further consists in certain details of construction fully described hereinafter, and illustrated in the accompanying drawings, in which—

Figure 1 is a side elevation, partly in cross-section, of my improved hay-tedder; Fig. 2, a plan view, part of the thill or tongue frame being removed; Fig. 3, a rear elevation on an enlarged scale, showing one of the forks and its operating devices; and Fig. 4, a similar view showing a modification, the centers of motion being differently arranged.

The frame of the machine is constructed in any suitable manner to support the operating parts. As shown, it consists of an open rectangular frame, A, supported by the axle B, so as to swing thereon, and a tongue or thill frame, C, having its bearings upon the axle and provided with a pole or thills. The wheels E E are mounted upon the axle, which is provided with a suitable clutch or with a ratchet-wheel, $a$, to which is adapted a spring-pawl, $b$, on the wheel, so that the forward movement of the wheel only will cause the revolution of the axle.

The tedder-fork consists of an arm, F, provided with forks or prongs $d\ d$, each bent at one end into a spring-coil, which is connected to the arm, so as to constitute an elastic connection between the prong and its arm, thereby preventing breaking of the prongs upon striking any unyielding substance. Each arm F extends through and slides in a rocking bearing, $e$, upon the standard $f$, and derives its motion from a revolving disk, $g$, a crank-pin, $i$, of which extends through a bearing of the arm, so that by the revolution of the crank-disk the arm and its forks will be carried downward until the prongs are inserted in the hay, and then moving to one side, carrying the hay toward one of the wheels, and at the same time lifting it so as to turn it over, with a motion very similar to that made by a fork operated by hand. Two of the positions taken by the fork thus operated are shown in Figs. 3 and 4. In the latter case, however, the fulcrum is directly above the crank-shaft, while in Fig. 3 it is at one side, so that the fork descends vertically.

I have shown four forks, with operating mechanism, arranged upon the rocking-frame A, but any suitable number may be employed, and, if desired, reverse motions may be imparted to the different disks, so that adjacent forks will pitch the hay toward each other, or away from each other.

The rotation of the disk $g$ is effected by gearing connected with the axle. Different arrangements of gear may be employed. One which is effective consists of gear-wheels $h$ upon the axle engaging with pinions $j$, upon the shafts of the disks $g$, which shafts are carried by suitable frames, G. I suspend each frame G to the axle B, so as to vibrate thereon, and interpose a spring, $n$, between an arm, $m$, of the frame G and a bearing upon the frame A, so that in case the fork on its downward movement strikes a rock or other unyielding object, the frame G will swing upon the shaft B and prevent the breaking of the fork.

In some instances the disks $g$ may be parallel to the axle; but I generally set them at an angle, as shown, as it is desirable to compensate for the forward motion of the machine, which, in connection with the transverse motion of a fork traveling in a plane parallel to the axle, would, in effect, operate upon the hay in the same manner if the machine were stationary and the fork swung diagonally. For this purpose I set each disk $g$ so that the edge making its downward movement is forward of the edge moving upward. Thus each disk is set at an angle to the axle and driven by suitable gearing, so that the forks will be carried downward toward the machine and rise away from the machine while the latter moves forward, the combined motions causing the fork to travel with the hay collected thereby in a path practically parallel to the axle-shaft, so that the hay will be tossed across the path of the machine at right angles thereto instead of diagonally thereto, as results when the disks are parallel to the axle, and there is no drag upon the fork from the forward motion of the machine. Of course the effect will be modified by the speed of the machine. The crank-shafts may therefore be set to suit the average speed; but it is preferable for the bearing-arm $p$ of the supporting-frame G to be so pivoted at $z$ to the arm $m$ of the frame G that the angle of said arm $p$ and its shaft may be changed, the gears $h\,j$ being formed to maintain the mesh, whatever may be the set of the arm $p$. A rod, $q$, attached to all the arms, is connected to a hand-lever, M, whereby the driver may change the angle at will. When the forks are to be lifted from the ground, the frame A is swung upon the axle, so as to lift the rear end. This may be effected by any suitable device—for instance, a lever, J, upon the frame C, connected by a rod, $t$, to the forward end of the frame A.

Without limiting myself to the precise construction and arrangement of parts shown, I claim—

1. The combination, in a hay-tedder, of a frame supported by wheels, a driving-axle, a series of crank-shafts carrying crank-disks, a series of forks with arms sliding at the upper ends in rocking bearings, and each connected directly to the wrist-pin of one of the crank-disks, whereby the fork is oscillated transversely, and independent yielding connections between each crank-shaft and the frame, substantially as set forth.

2. The combination, with the frame and forks, of crank-wheels set at an acute angle to the driving-shaft and connected to the fork-arms, substantially as set forth.

3. The combination of the driving-axle, swinging and sliding forks, crank-disks, frames supporting the disk-shafts, and means for adjusting the angle of said shafts, substantially as specified.

4. The combination, with the driving-axle B, provided with gear-wheels, of supporting-frames, the rocking bearings carried by said frames, the crank-shafts also carried by said frames and geared to the wheels upon the axle, the tedder-arms pivoted to the crank-pins and extending through said rocking bearings, and a rod connected to the crank-shaft bearings to adjust them, substantially as set forth.

5. The combination of the revolving axle, the frames G, the crank-shafts carried by said frames and provided with the crank-disks, the rocking bearings also carried by said frames, the tedder-forks connected to said disks and sliding in said bearings, and gears whereby said disks are driven from the revolving axle, substantially as specified.

6. The combination, with the axle B, frame A, crank-shafts, tedder-arms, and sliding bearings for the latter, of the supporting-frame G, hung to the axle and provided with spring-bearings, for the purpose set forth.

In testimony whereof I have signed my name to this specification in the presence of two subscribing witnesses.

FULLER TRUMP.

Witnesses:
W. A. SCOTT,
C. L. BOGLE.